Patented Aug. 7, 1951

2,563,383

UNITED STATES PATENT OFFICE 2,563,383

TERMINALLY UNSATURATED POLYTHIO POLYETHERS

William E. Vaughan and Frederick F. Rust, Berkeley, Calif., assignors to Shell Development Company, San Francisco, Calif., a corporation of Delaware No Drawing. Application January 29, 1949, Serial No. 73,668

11 Claims. (Cl. 260—609)

This invention relates to terminally unsaturated polythio polyethers. More particularly, the invention provides compounds of the formula, $T_1$—$(Y$—$R)_n$—$T_2$, in which each R represents a divalent hydrocarbon radical, each Y represents a member of the group consisting of the thio and the oxy groups, with at least two thio groups being present in each molecule, $T_1$ represents an olefinically unsaturated hydrocarbon radical, $T_2$ represents a member of the group consisting of the thio group and the olefinically unsatuated hydrocarbon radicals, and $n$ represents an integer greater than two.

This application is a continuation-in-part of two of our copending applications, (A) Serial No. 707,765, now abandoned, filed November 4, 1946, and (B) Serial No. 585,389, filed March 28, 1945, now U. S. Patent Number 2,522,590. Application (A) is a continuation-in-part of our copending application (C) Serial No. 585,388, filed March 28, 1945, now U. S. Patent Number 2,522,589. Application (C) is a continuation-in-part of our application Serial No. 385,701, filed March 28, 1941, which has now issued as U. S. Patent No. 2,398,479. Application (B) is a continuation-in-part of our application Serial No. 395,762, filed May 29, 1941, which has now issued as U. S. Patent No. 2,392,294.

It was heretofore known that polymeric substances composed of recurring units of the formula, (Y—R), where Y and R represent the groups defined above, could be prepared by double decomposition reactions between an organic dihalide and a salt of hydrogen sulfide in an alkaline medium. The products of such double decomposition reactions are saturated compounds of indeterminate structure. The initial products of the reaction are primarily dimercaptides which can be converted to dimercaptans by the reactions of an inorganic acid, but which, in any case, contain a relatively high percentage of halogen atoms, probably in the terminal groups, and have an exceedingly disagreeable odor.

The novel unsaturated compounds provided by the present invention contain the same recurring units but are entirely free of halogen, have a comparatively mild odor, and have the chemical properties characteristic of compounds containing at least one olefinic double bond. The absence of the halogen in these long chain-like linear molecules render them free of any tendency to cause corrosion of metal surfaces and they are particularly valuable synthetic lubricants.

The unsaturated polyethers provided by the invention have been found to exhibit valuable properties in the preparation of insecticidal compositions. An unsaturated polyether of this class was deodorized by the procedure described in Example VIII, and was found to exhibit an LD 50 value (parts per million in water, which prevent 50% of the spores of the test fungus from germinating) of 180 when tested with *Monolinia fructicola*. Thus, as these polyethers can be provided at low cost, they provide particularly valuable carriers for use in fungicidal compositions, since by using them a fungicidal composition, all ingredients of which are active, can be formulated at low cost.

The compounds provided by the present invention also have unexpected and valuable properties as plasticizers for vinyl resins. Although high molecular weight non-volatile organic compounds containing no acid groups are generally incompatible with the vinyl resins, such as polyvinyl chloride, a plastic composition compounded according to the recipe, 100 parts by weight of a copolymer of vinyl chloride and vinyl acetate containing about 95% of vinyl chloride, and 60 parts of a polyether prepared by the process of Example I (deodorized by treatment with 25% of the amount of hydrogen peroxide equivalent to its sulfur content) was found to have the following properties:

| | |
|---|---:|
| Tensile strength, p. s. i | 2445 |
| Elongation (per cent at rupture) | 380 |
| 100% modulus, p. s. i | 890 |
| Permanent set per cent | 29 |
| Brittle point °C | −25 |
| Shore "A" hardness | 57 |
| Stiffness, p. s. i | 780 |

Thus, the compounds provided by the invention provide valuable low cost plasticizers for polyvinyl resins, and as plasticizers are additionally advantageous in that they contain a plurality of thio groups, which are known to exhibit a stabilizing effect upon halogen-containing polymers.

By adding a thiol-substituted acid, such as thioglycollic acid, to the polyethers, such as those produced in a reaction such as is described in Example I, continuing to form free radicals in the reaction mixture, and extracting the acids so produced with an aqueous alkali, particularly valuable surface active agents of a substituted fatty acid type are obtained.

The polyethers provided by the present invention, in which each hydrocarbon group (represented by R in the general formula) contains a straight-chain of 2 carbon atoms, are a valuable source of heterocyclic sulfur-containing compounds. The unsaturated polymeric ethers produced in Example III, without further treatment, were found to produce a substantially quantitative yield of thioxane and dithiane when heated to about 200° C. This ready production of heterocyclic compounds is surprising because it is reported in the literature, that polymeric substances prepared by the double decomposition reaction (although they contain similar chains of ethylene groups joined by alternate thio and oxy groups, and would be theoretically capable of undergoing a similar conversion to heterocyclic compounds) do not undergo such conversion, unless the heating is accomplished under vacuum in the presence of a free halogen or a halogen hydride.

By heating an unsaturated polyether produced, for example, by the process described in Example I, with 20% of its weight of sulfur for two hours at 140° C., the polyether is converted to a valuable sulfurized polymer having a fungicidal activity in addition to the plasticizing, vulcanizing and the like properties of sulfurized polymers. The sulfurized polyethers exhibits maximum kills at several concentrations when tested with *Monolinia fructicola* or *Alternaria coleracia*. Several of the thio-carbamates commonly employed as fungicides similarly exhibit maximum kills at various concentrations rather than a single LD 50 value, when tested with the same fungus.

While the compounds provided by the present invention can, as can any organic compound, be prepared by various methods in which sufficient steps and precaution are taken to obtain the same structure, the compounds are best prepared by the reaction processes described and claimed in the patents and applications of which the present application is a continuation-in-part. These patents and applications describe in detail processes for the addition of hydrogen sulfide or dithiols to unsaturated organic compounds, in which processes, the addition reaction is initiated by irradiation with light capable of forming free radicals by the rupture of the H—S bonds; by the thermal decomposition of a compound, such as an organic peroxide, which decomposes to form free radicals when heated; or catalyzed by various ionic compounds such as amines.

The compounds of the present invention are preferably prepared by addition reactions conducted in the presence of free radicals either formed by the action of ultraviolet light or by the thermal dissociation of a peroxide. The addition reactions conducted in this manner, when the unsaturated compound contains its aliphatic unsaturation in the form of two terminal =CH₂ groups, produce polyethers in which each of the thio groups are attached to at least one primary carbon atom. The linkage of sulfur to a primary carbon has proven to be more stable, e. g., less susceptible to rupture at elevated temperatures or by the action of acids than is a similar linkage of sulfur to a secondary or tertiary carbon atom.

The polyethers provided by the invention are prepared by the addition reaction between (A) one or more aliphatic dithiols and/or hydrogen sulfide, and (B) one or more ethers or sulfides containing in each of two radicals, separated by at least one oxy or one thio group, an olefinic double bond, preferably in the form of a terminal =CH₂ group.

The class of compounds provided by the invention have the formula, $T_1—(Y—R)_n—T_2$, as defined in the initial paragraph of the specification. They may be visualized as being formed by the following reaction in which each H—Y—H represents hydrogen sulfide, or a dithiol, and C=C—Z—C=C represents a diolefinic ether or sulfide. However, the invention is not limited to the employment of monoethers or monosulfides and the dithiol may contain thio or oxy groups, C=C—Z—C=C+H—Y—H+C=C—Z—C=C+
   H—Y—H+C=C—Z—C=C+N—Y—H→
C=C—Z—CH—C—Y—C—CH—Z—CH—
        C—Y—C—CH—Z—CH—C—Y—H When the addition reaction is initiated by free radicals, —Y— groups become attached to the doubly bound carbon atoms bearing the greatest number of hydrogen atoms, in this case, the terminal carbon atom as indicated above. When the addition is initiated by an ionic catalyst, the —Y— groups, become attached to the doubly bound carbon atom bearing the least number of hydrogen atoms, in this case, the carbon atom adjacent to Z in the diolefinic compound.

Because of their complex structure, examples of particular polyethers provided by the invention, can be most clearly illustrated by giving examples of the compounds from which they are formed in accordance with the above equation. They are formed from diolefinically unsaturated oxy and thio ethers such as divinyl, diallyl, di-2-butenyl and bis(2-cyclohexylvinyl)ether and their thio-analogs, diolefinically unsaturated polyoxy and polythio ethers such as 1,2-divinyloxyethane, 1,3-diallylmercaptopropane, 1,4-divinyloxycyclohexane and 1,4-dimethallylmercaptocyclohexane; by the above type addition reactions, with hydrogen sulfide, or with dithiols such as 1,2 - ethanedithiol, bis(3 - mercaptopropyl) ether, 2-ethoxy-1,3-propanedithiol, bis(3-mercaptopropyl) sulfide, 2,3-dimercaptomethylcyclohexane and bis(4-mercaptocyclohexyl)ether.

At least one terminally unsaturated group is present in each polymolecule when the addition reaction is conducted between a dithiol and a diolefinic compound employed in a molar ratio of from 0.25 to 1.0 mole of dithiol per mole of the diolefinic compound.

The polyethers are molecules each containing a plurality of recurring sulfide or ether monomers when they have boiling points above 240° C. at 1 cm.

A preferred class of the polyethers provided by the invention (class A) have the formula, R'OR(SROR)ₙ—T, where each R represents an alkylene radical, R' represents an alkenyl radical containing the double bond in a terminal =CH₂ group, T represents the thiol group or the radical R', and n represents an integer greater than two. The compounds of class A are prepared by the addition of hydrogen sulfide to a dialkenyl ether containing each double bond in a terminal =CH₂ group. Illustrative examples of ethers from which the polyethers of class A are prepared include: diallyl ether, divinyl ether, dimethallyl ether, 3-butenyl vinyl ether and di-4-pentenyl ether. Dialkenyl ethers containing about 5 carbon atoms in each alkenyl radical are preferred in the production of the polyethers of class A. The polyethers of class A are also prepared by the addition of an alkanedithiol to the above dialkenyl ethers. Illustrative examples of the alkanedithiols from which polyethers of class A can be prepared include: 1,2-ethanedithiol, 1,3-propanedithiol, 1,2-butanedithiol, 1,3-pentanedithiol, 2-ethyl-1,3-propanedithiol, and 1,5-pentanedithiol. Dithiols containing no more than 5 carbon atoms in the hydrocarbon chain are preferred in the preparation of the polyethers of class A.

Another preferred class of the polyethers provided by the present invention (class B) have the formula, R'OROR(SROROR)$_n$—T, in which each R represents an alkylene radical, R' represents an alkenyl radical containing a double bond in the terminal =CH$_2$ group, T represents the thiol group or the radical R', and $n$ represents an integer greater than two. The polyethers of class B are prepared by the addition of hydrogen sulfide to diolefinic aliphatic polyethers which are saturated with the exception of 2 terminal =CH$_2$ groups. Illustrative examples of polyethers from which compounds of class B are prepared include: 1,2-divinyloxyethane, 1,2-diallyloxypentane, 1,3-bis(3-butenyloxy)butane, 1-vinyloxy-2-allyloxyethane and 1,1-diallyloxyethane.

Another preferred class of compounds prepared by the invention (class C) have the formula, R'(SR)$_n$—T, where each R represents an alkylene radical, R' represents an alkenyl radical containing a double bond in the terminal =CH$_2$ group, T represents the thiol group or the radical R', and $n$ represents an integer greater than two. The compounds of class C are produced by the addition of hydrogen sulfide to a dialkenyl sulfide. Illustrative examples of the dialkenyl sulfides from which the compounds of class C are prepared include: diallyl sulfide, divinyl sulfide, dimethallyl sulfide, 3-butenyl vinyl sulfide and di-4-pentenyl sulfide. The compounds of class C are also prepared by the addition of an alkanedithiol to such dialkenyl sulfides. Illustrative examples of the alkanedithiols from which compounds of class C are prepared include: 1,2-ethanedithiol, 1,3-propanedithiol, 1,2-butanedithiol, 1,3 - pentanedithiol, 2 - ethyl - 1,3 - propanedithiol and 1,5-pentanedithiol.

The compounds provided by the invention are generally low molecular weight polymers, i. e., polymers having a molar weight of less than 10,000. However, these polyethers can be obtained with a molar weight of about 14,000. In the latter case they are solid materials having a sharp melting point and a crystalline structure as indicated by X-ray analysis. The high molecular weight polyethers are obtained by employing substantially exactly the stoichiometric amounts of the reactants and conducting the addition reaction under the influence of ultraviolet light, while employing an inert solvent for the reaction. Hydrocarbons such as cyclohexane, pentane, nonane and decane are suitable solvents. The compounds provided by the invention which are low molecular weight polymers are generally liquid, but when each of the recurring hydrocarbon radicals contain straight-chains of two carbon atoms the compounds are generally greasy solids.

The following examples are presented to illustrate in detail the preparation and properties of the compounds provided by the present invention. As numerous variations in the structural formulas of the compounds and in the methods of preparing them, are within the scope of the invention the invention is not to be construed as limited to the particular compounds or methods of preparation specified in the examples.

EXAMPLE I

Polyethers of the formula,

where T represents the thiol group or the radical —S(CH$_2$)$_3$O(CH$_2$CH=CH$_2$, and $n$ represents an integer greater than one, are produced by a reaction conducted in accordance with the following procedure:

(a) An equimolar mixture of hydrogen sulfide and diallyl ether, maintained in the liquid phase at a temperature of from 0° C. to 25° C. in a quartz vessel, is subjected to the light emanating from a 400 watt quartz mercury arc lamp placed 6 inches from the vessel. The polyethers are isolated by distilling off the materials boiling below about 240° C. at 1 cm. pressure.

(b) An equimolar mixture of hydrogen sulfide and diallyl ether containing 5 mole percent of di-tertiary-butyl peroxide, is heated to a temperature of from 100° C. to 150° C., while maintaining the reactants in the liquid phase. The polyethers are isolated by distilling off the materials boiling below about 240° C. at 1 cm. pressure.

A water-white liquid polymeric product boiling above 235° C. at 2.3 cm. pressure was produced in a 92% yield by a reaction conducted in accordance with procedure (a), employing a reaction time of 80 minutes. The product was indicated, by the following analysis, to be a mixture of polyethers of the above formula, predominantly the polyether of the above formula where T is the thiol group and $n$ is four (calculated MW 660, sulfur content 24% and a mercaptan content, as sulfur, 4.85%).

MW (cryo benzene) _____ 644
Percent S _____ 24.8
Percent mercaptan (as S) _____ 5.1

The polyether so obtained had a micro pour point of —45° C., a viscosity (in centistokes) of 46.6 at 100° F. and 13.26 at 210° F., a viscosity index of 152 and an SAE No. of from 20 to 30.

A water-white liquid polymeric product boiling above 240° C. at 2 cm. pressure was produced in a 70% yield by a reaction conducted in accordance with procedure (b), employing a temperature of 100° C. and a reaction time of 30 hours. The chemical analysis and physical properties of the product indicated it to be substantially the same as the polyether prepared by procedure (a).

EXAMPLE II

Polyethers of the formula,

where T is the thiol group or the radical,

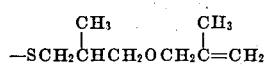

and $n$ is an integer greater than one, are produced by a reaction conducted in accordance with the following procedure.

(a) An equimolar mixture of hydrogen sulfide and dimethallyl ether, maintained in the liquid phase at a temperature of from 0° C. to 25° C. in a quartz vessel, is subjected to the light emanating from a 400 watt quartz mercury arc lamp placed 6 inches from the vessel. The polyethers are isolated by distilling off the materials boiling below about 240° C. at 1 cm. pressure.

A water-white, liquid polymeric product boiling above 240° C. at 2 cm. pressure was produced in an 83% yield by a reaction conducted in accordance with the above procedure, employing a reaction time of 2 hours. The product was indicated, by the following analysis, to be a mixture of polyethers of the above formula, predominantly the polyether of the above formula where T is the thiol group and $n$ is three.

MW (cryo benzene) _____ 661
Percent S _____ 23.1
Percent mercaptan (as S) _____ 7.8

The polyethers had a micro pour point of −35° C., a viscosity (in centistokes) of 62.71 at 100° F. and 10.01 at 210° F., a viscosity index of 136 and an SAE No. of 20.

EXAMPLE III

Polyethers of the formula, $CH_2=CHOCH_2CH_2(SCH_2CH_2OCH_2CH_2)_n$—T where T represents the thiol group or the radical, —$SCH_2CH_2OCH=CH_2$, and $n$ is an integer greater than one, are produced by a reaction conducted in accordance with the following procedure.

(a) An equimolar mixture of hydrogen sulfide and divinyl ether, maintained in the liquid phase at a temperature of from 0° C. to 25° C. in a quartz vessel, is subjected to the light emanating from a 400 watt quartz mercury arc lamp placed 6 inches from the vessel. The polyethers are isolated by distilling off the materials boiling below about 240° C. at 1 cm. pressure.

A greasy, white solid polymeric product boiling above 240° C. at a pressure of 2 cm. was produced in a 93% yield by a reaction conducted in accordance with the above procedure, employing a reaction time of 10 minutes. The polyethers had molecular weights of from 1000 to 1100, a micro pour point of 25° to 50° C., and a viscosity index of 129.

EXAMPLE IV

Polyethers of the formula, $CH_2=CHOCH_2CH_2OCH_2CH_2$
$(SCH_2CH_2OCH_2CH_2OCH_2CH_2)_n$—T where T represents the thiol group or the radical —$SCH_2CH_2OCH_2CH_2OCH=CH_2$, and $n$ represents an integer greater than one, are produced by a reaction conducted in accordance with the following procedure.

(a) An equimolar mixture of hydrogen sulfide and 1,2-divinyloxyethane, maintained in the liquid phase at a temperature of from 0° C. to 25° C. in a quartz vessel, is subjected to the light emanating from a 400 watt quartz mercury arc lamp, placed 6 inches from the vessel. The polyethers are isolated by distilling off the materials boiling below about 240° C. at 1 cm. pressure.

EXAMPLE V

Polyethers of the formula, $CH_2=CHCH_2O(CH_2)_3$
$[S(CH_2)_2O(CH_2)_2S(CH_2)_3O(CH_2)_3]_n$—T where T represents the radical

—$S(CH_2)_2O(CH_2)_2SH$ or the radical,

—$S(CH_2)_2O(CH_2)_2S(CH_2)_3OCH_2CH=CH_2$ and $n$ represents an integer greater than one, are produced by a reaction conducted in accordance with the following procedure.

(a) An equimolar mixture of bis(2-mercaptoethyl)ether and diallyl ether, maintained in the liquid phase at a temperature of from 0° C. to 25° C. in a quartz vessel, is subjected to the light emanating from a 400 watt quartz mercury arc lamp placed 6 inches from the vessel. The polyethers are isolated by distilling off the materials boiling below about 240° C. at 1 cm. pressure.

A water-white polymeric product boiling above 240° C. at 2 cm. pressure was produced by a reaction conducted according to the procedure described above, employing a reaction time of one hour. The polyethers had an average molecular weight of 871, a micro pour point of −39° C., a viscosity index of 151 and an SAE No. of 20.

EXAMPLE VI

Polyethers of the formula, $CH_2=CHCH_2O(CH_2)_3$
$[S(CH_2)_2S(CH_2)_3O(CH_2)_3]_n$—T where T represents the radical —$S(CH_2)_2SH$ or the radical, —$S(CH_2)_2S(CH_2)_3OCH_2CH=CH_2$, and $n$ represents an integer greater than one, are produced by a reaction conducted in accordance with the following procedure.

(a) An equimolar mixture of 1,2-ethanedithiol and diallyl ether, maintained in the liquid phase at a temperature of from 0° C. to 25° C. in a quartz vessel, is subjected to the light emanating from a 400 watt quartz mercury arc lamp placed 6 inches from the vessel. The polyethers are isolated by distilling off the materials boiling below about 240° C. at 1 cm. pressure.

EXAMPLE VII

Polyethers of the formula, $CH_2=CHCH_2[S(CH_2)_3]_n$—T where T represents the allylmercapto radical or the thiol group and $n$ represents an integer greater than two, are produced by reactions conducted in accordance with the following procedure.

(a) An equimolar mixture of hydrogen sulfide and diallyl sulfide, maintained in the liquid phase at a temperature of from 0° C. to 25° C. in a quartz vessel, is subjected to the light emanating from a 400 watt quartz mercury arc lamp placed 6 inches from the vessel. The polyethers are isolated by distilling off the materials boiling below about 240° C. at 1 cm. pressure.

(b) An equimolar mixture of 1,3-propanedithiol and diallyl sulfide, maintained in the liquid phase at a temperature of from 0° C. to 25° C. in a quartz vessel, is subjected to the light emanating from a 400 watt quartz mercury arc lamp placed 6 inches from the vessel. The polyethers are isolated by distilling off the materials boiling below about 240° C. at 1 cm. pressure.

EXAMPLE VIII

The somewhat garlic-like odor of the polymers of the formula, $T_1—(Y—R)_n—T_2$, as defined in the initial paragraph of the specification, is substantially removed by adding to them from 25 to 50% of an equimolar amount of 30% aqueous hydrogen peroxide based on the moles of sulfur contained in the amount of polyether to be deodorized, and allowing the mixture to stand for a few hours.

A 20 gram sample of the polyether prepared by the procedure described in Example I was deodorized by adding 18 grams of 30% hydrogen peroxide. The first half of the peroxide was slowly added to the polymer which had been cooled to about 0° C. while the temperature was controlled so that it did not rise above about 30° C. The remainder of the peroxide caused no further exothermic reaction. The treated polymer had substantially the same properties as an untreated sample, but was comparatively odorless.

EXAMPLE IX

Polymers in which both terminal groups are unsaturated hydrocarbon radicals are produced by reactions conducted in accordance with either the procedures (a) or (b) in Example I by employing molar proportions of the dithiol to the diolefinic compound in which the diolefinic compound is in excess.

Three polymeric products were produced by reactions conducted in accordance with the procedure (a) described in Example II, employing mole ratios of hydrogen sulfide to diallyl ether of, respectively, 0.25 mole, 0.50 mole and 1 mole of the thiolic compound per mole of the diolefinic compound. The mercaptan (as per cent S) was, respectively, about 0.02%, 0.05% and 5.1%, in samples having the respective molecular weights 346, 408 and 674, indicating that employing an excess of the unsaturated compound results in two rather than one unsaturated groups per molecule. Each of the polymeric products were colorless liquids boiling above 240° C. at 1 cm. pressure and the viscosity indexes were determined to be, respectively, 162, 161 and 152, indicating that with the exception of the increase in the number of olefinic groups the products were substantially equivalent.

We claim as our invention:

1. A polymer of the formula, $$CH_2=CHCH_2O(CH_2)_3[S(CH_2)_3O(CH_2)_3]_nS(CH_2)_3OCH_2CH=CH_2$$

in which $n$ is an integer greater than one, said polymer having a molecular weight of at least 600 and boiling above 240° C. at 1 cm. mercury pressure.

2. A polymer of the formula,

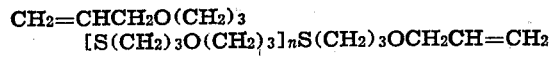

in which $n$ is an integer greater than one, said polymer having a molecular weight in excess of 600 and boiling above 240° C. at 1 cm. mercury pressure.

3. A polymer of the formula, $$CH_2=CHOCH_2CH_2(SCH_2CH_2OCH_2CH_2)_n-SH$$

in which $n$ is an integer greater than one, said polymer having a molecular weight in excess of 600 and boiling above 240° C. at 1 cm. mercury pressure.

4. A mixture of linear polymeric organic compounds boiling above 240° C. at 1 cm. mercury pressure and having an average molecular weight in excess of 600, said mixture consisting essentially of compounds of the general configuration

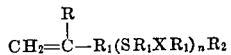

wherein R is a member selected from the group consisting of the hydrogen atom and the lower alkyl radicals, $R_1$ is a member selected from the group consisting of the lower alkylene radicals and lower oxaalkylene radicals, X is a member selected from the group consisting of —O— and —S—, and $R_2$ is a member selected from the group consisting of

the symbols R, $R_1$ and X as employed in the latter group being as heretofore defined, and $n$ is an integer.

5. A lubricating composition consisting essentially linear polymeric organic compounds boiling above 240° C. at 1 cm. mercury pressure and consisting essentially of compounds of the general configuration $$R'-O-R[S-R-O-R]_n-SH$$

wherein each R is an independently selected lower saturated aliphatic hydrocarbon radical, R' is a lower alkenyl radical containing the double bond in a terminal $=CH_2$ group, and $n$ is an integer.

6. A lubricating composition consisting essentially of polymers having the following general configuration:

$$R_1-O(CH_2)_m-[S-(CH_2)_m-O-(CH_2)_m]_nSH$$

wherein $R_1$ is an alkenyl radical containing not less than 2 and not more than 4 carbon atoms, $m$ is an integer having a value not less than 2 and not more than 4, and $n$ is an integer the average value of which is such that the mixture of polymers has a minimum boiling point above about 240° C. at 1 cm. mercury pressure.

7. A lubricating composition consisting essentially of polymers having the structure

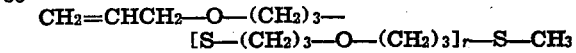

wherein $r$ is an integer the average value of which is such that the mixture of polymers has a minimum boiling point above about 240° C. at 1 cm. mercury pressure.

8. A lubricating composition consisting essentially of polymers having the structure

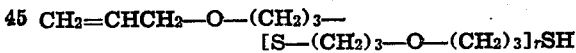

wherein $r$ is an integer the average value of which is such that the mixture of polymers has a minimum boiling point above about 240° C. at 1 cm. mercury pressure.

9. A lubricating composition consisting essentially of linear organic compounds boiling above 240° C. at 1 cm. mercury pressure, said compounds having the general formula:

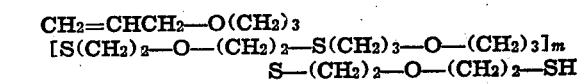

wherein $m$ is an integer.

10. A lubricating composition consisting essentially of a mixture of polymers having the structural formulae

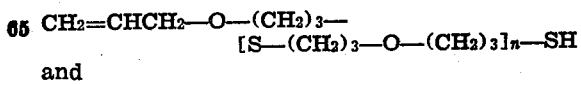

and

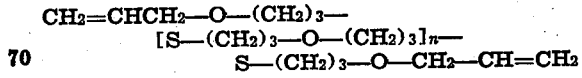

in which $n$ represents an integer greater than 1, said composition containing predominantly the compound having the structure that is defined by the first of the above formulae with $n$ being 4.

11. A lubricating composition consisting essentially of a mixture of polymers having the structural formulae

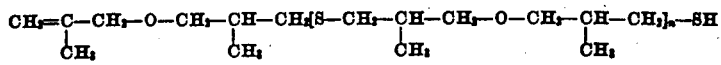

and

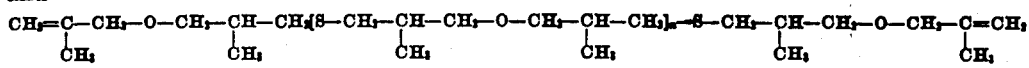

in which $n$ represents an integer greater than 1, said composition containing predominantly the compound having the structure that is defined by the first of the above formulae with $n$ being 3.

WILLIAM E. VAUGHAN.
FREDERICK F. RUST.

REFERENCES CITED

The following references are of record in the file of this patent:

UNITED STATES PATENTS

| Number | Name | Date |
|---|---|---|
| 2,043,941 | Williams | June 9, 1936 |
| 2,163,176 | Keyssner | June 20, 1939 |
| 2,230,966 | Reid | Feb. 4, 1941 |
| 2,352,435 | Hoeffelman | June 27, 1944 |
| 2,392,294 | Rust | Jan. 1, 1946 |
| 2,398,479 | Vaughan | Apr. 16, 1946 |